(12) United States Patent
Katoh et al.

(10) Patent No.: US 12,158,200 B2
(45) Date of Patent: Dec. 3, 2024

(54) GEAR PAIR

(71) Applicant: MUSASHI SEIMITSU INDUSTRY CO., LTD., Toyohashi (JP)

(72) Inventors: Shiryu Katoh, Toyohashi (JP); Shinya Matsuoka, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 18/271,323

(22) PCT Filed: Jan. 15, 2021

(86) PCT No.: PCT/JP2021/001226
§ 371 (c)(1),
(2) Date: Jul. 7, 2023

(87) PCT Pub. No.: WO2022/153479
PCT Pub. Date: Jul. 21, 2022

(65) Prior Publication Data
US 2024/0167556 A1    May 23, 2024

(51) Int. Cl.
*F16H 55/08*    (2006.01)
*F16H 1/14*    (2006.01)

(52) U.S. Cl.
CPC .............. *F16H 55/08* (2013.01); *F16H 1/14* (2013.01)

(58) Field of Classification Search
CPC ........... F16H 55/08; F16H 1/14; F16H 55/088
See application file for complete search history.

(56) References Cited

U.S. PATENT DOCUMENTS

| | | |
|---|---|---|
| 3,937,098 A | 2/1976 | Rouverol |
| 6,101,892 A | 8/2000 | Berlinger, Jr. et al. |
| 2013/0118282 A1* | 5/2013 | Potts ................. F16H 1/003 |
| | | 29/893.3 |

(Continued)

FOREIGN PATENT DOCUMENTS

| | | |
|---|---|---|
| JP | S5182851 A | 7/1976 |
| JP | H08-219257 A | 8/1996 |
| JP | 4429390 B2 | 3/2010 |

(Continued)

OTHER PUBLICATIONS

Translation JP2013019476A (Year: 2013).*

(Continued)

*Primary Examiner* — Terence Boes
(74) *Attorney, Agent, or Firm* — Carrier, Shende & Associated P.C.; Joseph P. Carrier; Fulchand P. Shende (57) ABSTRACT

In a gear pair in which a first gear and a second gear having a larger number of teeth than the first gear share a meshing line (L) of teeth that mesh with each other, at least a part of the meshing line (L) includes a region where a pressure angle (a) is not constant, and the pressure angle ($\alpha$) weakly increases in a section of the meshing line (L) from a pitch point (Pp) to an end point (Pe1) on a tooth-root side of the first gear (G1). This allows both desired properties (for example, strength) and smooth meshing to be achieved, and also allows effective increase in strength of the tooth-root side of the gear having the small number of the teeth (that is, the first gear) subject to a large load and susceptible to damages on the tooth-root side.

10 Claims, 10 Drawing Sheets

(56) References Cited

U.S. PATENT DOCUMENTS

2017/0183061 A1    6/2017   Yamamoto

FOREIGN PATENT DOCUMENTS

JP      2013-019476 A    1/2013
JP      2017-119462 A    7/2017

OTHER PUBLICATIONS

PCT/ISA/210 from International Application PCT/JP2021/001226.
PCT/ISA/237 from International Application PCT/JP2021/001226.
Office Action, Notice of Reasons for Refusal, issued on Jan. 23, 2024 in the corresponding Japanese Patent Application No. 2022-574986 with the machine-generated English translation thereof.

* cited by examiner

GEAR PAIR

TECHNICAL FIELD

The present invention relates to a gear pair comprising a first gear and a second gear having a larger number of teeth than the first gear.

In the present invention and the present specification, "a meshing line of teeth that mesh with each other" refers to a segment corresponding to a movement trajectory of a contact point (meshing point) of teeth that mesh with each other. An expression "the meshing line is shared" means that the contact point moves continuously on a single continuous meshing line in a process of moving from a start point to an end point of meshing. For example, the expression means that the meshing line does not branch (specifically, the teeth that mesh with each other do not contact simultaneously at two points or more) or is not discontinued (specifically, the contact is not interrupted). Also, "a meshing line length" refers to a length of a segment of the meshing line from the start point of meshing.

In the present specification, "a relative curvature" is defined as a sum of a curvature of a tooth profile curve of one tooth and a curvature of a tooth profile curve of the other tooth at the contact point of the teeth that mesh with each other. There is a tendency that a stress limit increases in the vicinity of a tooth surface and a surface pressure strength increases as the relative curvature becomes smaller.

BACKGROUND ART

For defining a tooth profile curve of each gear of a gear pair, there is a technique of connecting a concave part on a tooth-root side and a convex part on a tooth-top side with a transition zone in a specific form, for example, in order to reduce a contact stress at a contact point (meshing point) of teeth that mesh with each other. This technique is conventionally known as disclosed in Patent Document 1, for example.

PRIOR ART DOCUMENTS

Patent Documents

Patent Document 1: Japanese Patent No. 4429390

SUMMARY OF THE INVENTION

Problems to be Solved by the Invention

In the gear pair of Patent Document 1, however, no consideration is given on how to set a pressure angle in defining the tooth profile curve. It is also not clear whether the gear pair shares the meshing line. Accordingly, sufficient efforts have not been made to smoothly mesh the gear pair and to increase the strength of each tooth.

In a gear pair comprising conventionally known involute gears, since a meshing line of teeth that mesh with each other is a single continuous line from the start point to the end point of meshing (that is, the meshing line is shared), there is an advantage that the meshing is smooth. However, a tooth profile curve of the involute gear has a relative curvature increasing toward a tooth-root side, and a surface pressure strength on the tooth-root side tends to decrease.

The present invention has been made in consideration of the above circumstances. An object of the present invention is to provide a gear pair that can solve the aforementioned problems all at once.

Means for Solving the Problems

In order to achieve the above object, the present invention has a first characteristic that, in a gear pair in which a first gear and a second gear having a larger number of teeth than the first gear share a meshing line of teeth that mesh with each other, at least a part of the meshing line includes a region where a pressure angle is not constant, and the pressure angle weakly increases (that is, not-strictly monotonically increases) in a section of the meshing line from a pitch point to an end point on a tooth-root side of the first gear.

In addition to the first characteristic, the present invention has a second characteristic that the pressure angle weakly increases in a section of the meshing line from the pitch point to an end point on a tooth-top side of the first gear.

In addition to the first or second characteristic, the present invention has a third characteristic that the pressure angle is constant in a section of the meshing line from the pitch point to a specific intermediate point on the tooth-root side of the first gear, and the pressure angle increases in a section from the specific intermediate point on the tooth-root side to the end point on the tooth-root side of the first gear.

In addition to any one of the first to third characteristics, the present invention has a fourth characteristic that the pressure angle is constant in a section of the meshing line from the pitch point to a specific intermediate point on the tooth-top side of the first gear, and the pressure angle increases in a section from the specific intermediate point on the tooth-top side to the end point on the tooth-top side of the first gear.

In addition to any one of the first to fourth characteristics, the present invention has a fifth characteristic that a value obtained by differentiating a curvature of a tooth profile curve by a meshing line length constantly changes in an entire region of the meshing line.

In addition to any one of the first to fifth characteristics, the present invention has a sixth characteristic that the pressure angle is greater than zero (0) degrees in the entire region of the meshing line.

In addition to any one of the first to sixth characteristics, the present invention has a seventh characteristic that the first and second gears are forged bevel gears.

Effects of the Invention

According to the first characteristic of the invention, in the gear pair comprising the first gear and the second gear having the larger number of the teeth than the first gear, the teeth that mesh with each other share the meshing line. Thus, the first and second gears can achieve smooth meshing. Moreover, at least a part of the meshing line includes the region where the pressure angle is not constant. Thus, while the meshing line is shared as above, it is possible to set the pressure angle of the both gears to various modes of change in association with the meshing line, and achieve both desired properties (for example, strength) in accordance with the setting, and smooth meshing. In addition, since the pressure angle weakly increases in the section of the meshing line from the pitch point to the end point on the tooth-root side of the first gear, the relative curvature can be reduced and the surface pressure strength can be increased on the tooth-root side of the first gear. Moreover, when the tooth profile curve comes close to a negative curvature or has the negative curvature on the tooth-root side, the tooth profile becomes wider toward the tooth root than when the pressure angle is simply increased. Thus, a bending strength can be increased. Accordingly, it is possible to effectively increase the strength on the tooth-root side of the gear having the small number of the teeth (that is, the first gear) which is subject to a large load and is susceptible to damages especially on the tooth-root side.

According to the second characteristic, the pressure angle weakly increases in the section of the meshing line from the pitch point to the end point on the tooth-top side of the first gear. Thus, the relative curvature can be reduced and the surface pressure strength can be increased not only on the tooth-root side but also on the tooth-top side of the first gear (that is, the gear having the small number of the teeth).

As the number of the meshing teeth changes during the meshing, contact stiffness of each tooth changes. According to the third characteristic, the pressure angle is constant in the section of the meshing line from the pitch point to the specific intermediate point on the tooth-root side of the first gear, and the pressure angle increases in the section from the specific intermediate point on the tooth-root side to the end point on the tooth-root side of the first gear. According to the fourth characteristic, the pressure angle is constant in the section of the meshing line from the pitch point to the specific intermediate point on the tooth-top side of the first gear, and the pressure angle increases in the section from the specific intermediate point on the tooth-top side to the end point on the tooth-top side of the first gear. According to each of the third and fourth characteristics, by setting a meshing region where the number of the meshing teeth is large (and thus the contact stiffness of each tooth is high) to a pressure angle constant section where the relative curvature is large and the contact stiffness of the tooth surface is low, tooth surface deformation due to Hertzian contact per tooth can be relatively increased. Thus, increase or decrease in contact stiffness of the tooth surface accompanying the change in the number of the meshing teeth during the meshing can be cancelled by increase or decrease in the tooth surface deformation based on the Hertzian contact. Accordingly, meshing stiffness of the entire tooth profile can be as uniform as possible (that is, difference in contact stiffness can be reduced) even with the change in the number of the meshing teeth. Further, by specially providing the aforementioned pressure angle constant section, the change in the relative curvature during the meshing can be reduced. Thus, smoother meshing can be achieved.

According to the fifth characteristic, the value obtained by differentiating the curvature of the tooth profile curve by the meshing line length constantly changes in an entire region of the meshing line. Thus, the relative curvature at the contact point of the teeth that mesh with each other also constantly changes during the meshing. Accordingly, similar to the effect of each of the third and fourth characteristics, a resulting curvature distribution can alleviate the difference in the contact stiffness of the tooth surface during the meshing (for example, a relative curvature of a one-tooth meshing region can be reduced, and a relative curvature of a two-teeth meshing region can be increased).

According to the sixth characteristic, the pressure angle is greater than zero (0) degrees in the entire region of the meshing line. Thus, at the contact point of the teeth that mesh with each other, the relative curvature is relatively small on average, and the surface pressure strength can be increased.

According to the seventh characteristic, the first and second gears are forged bevel gears. Thus, even a complex spherical tooth profile of the bevel gear can be easily and accurately formed by forging.

BRIEF DESCRIPTION OF THE DRAWINGS

FIGS. 1(A) to 1(C) are diagrams showing a gear pair according to a first embodiment, where

FIGS. 2(A) to 2(C) are diagrams showing a gear pair according to a second embodiment, where

FIGS. 3(A) to 3(C) are diagrams showing a gear pair according to a third embodiment, where

EXPLANATION OF REFERENCE NUMERALS

G1, G2 . . . first and second gears
L . . . meshing line
Pe1 . . . end point on the meshing line on a tooth-root side of the first gear
Pe2 . . . end point on the meshing line on a tooth-top side of the first gear
Pm1 . . . specific intermediate point from a pitch point on the meshing line on the tooth-root side of the first gear
Pm2 . . . specific intermediate point from the pitch point on the meshing line on the tooth-top side of the first gear
Pp . . . pitch point on the meshing line
$\alpha$ . . . pressure angle

MODE FOR CARRYING OUT THE INVENTION

Embodiments of the present invention will be described hereinafter based on the accompanying drawings.

First Embodiment

Figure 1A:
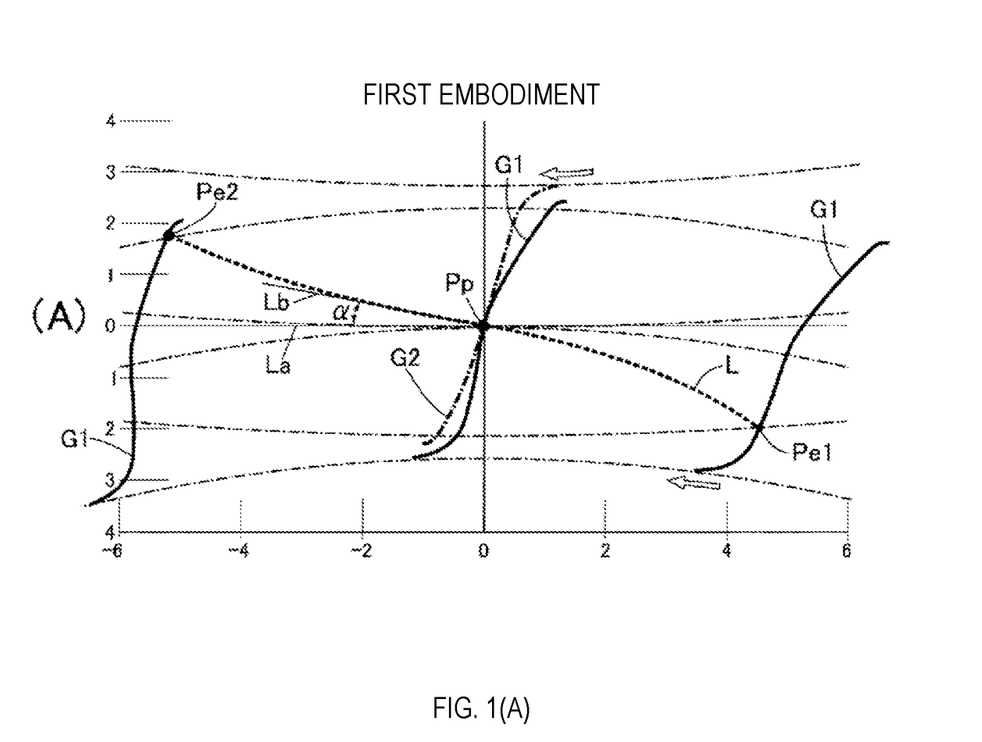
FIG. 1(A) shows an example of tooth surfaces and a meshing line of teeth that mesh with each other.

First, a gear pair of the first embodiment will be described with reference to FIGS. 1(A) to 1(C). The gear pair comprises spur gears having rotation axes parallel to each other and is a pair of first and second gears G1, G2 that mesh with each other. Specifically, the first gear G1 on a lower side of FIG. 1(A) is a small diameter gear having a small number of teeth, and functions as a drive gear. The second gear G2 on an upper side is a large diameter gear having a larger number of teeth than the first gear G1, and functions as a driven gear.

Which of the first gear G1 and the second gear G2 is set to be on a drive side or a driven side may be determined as desired.

In addition, FIG. 1(A) shows an example of a meshing mode between tooth surfaces (a thick solid line indicates a tooth surface of the first gear G1, and a thick dash-dotted line indicates a tooth surface of the second gear G2) when a contact point (hereinafter, referred to as a "meshing point") of teeth of the first and second gears G1, G2 that mesh with each other is located at a pitch point Pp on a meshing line L shown by a thick dotted line, together with examples of the tooth surfaces when the first gear G1 is at a start and an end of meshing.

Tooth surfaces of the first and second gears G1, G2 on the side opposite to the meshing side, which are not shown, are symmetrical in shape to the tooth surfaces on the meshing side in the present embodiment. In FIG. 1(A), the first gear G1 rotates counterclockwise, and the second gear G2 rotates clockwise.

The first and second gears G1, G2 rotate in an engaged manner, and along with the rotation, the meshing point of the teeth that mesh with each other moves continuously. A movement trajectory, that is, the meshing line L is a smooth curve as shown in the thick dotted line in FIG. 1(A). Specifically, the meshing line L of the first and second gears G1, G2 is not a straight line like a meshing line of involute gears. In other words, the first and second gears G1, G2 are not involute gears.

In the gear pair of the present embodiment, teeth of the first and second gears G1, G2 that mesh with each other share the meshing line L.

More specifically, the meshing point of the teeth that mesh with each other moves continuously on the single continuous meshing line L while traveling from a start point to an end point of meshing (that is, from an end point Pe1 on a tooth-root side to an end point Pe2 on a tooth-top side of the first gear G1). That is, the meshing line L does not branch (that is, the teeth that mesh with each other do not contact at two or more points simultaneously) or is not discontinuous (that is, the contact is not interrupted).

Figure 1B:
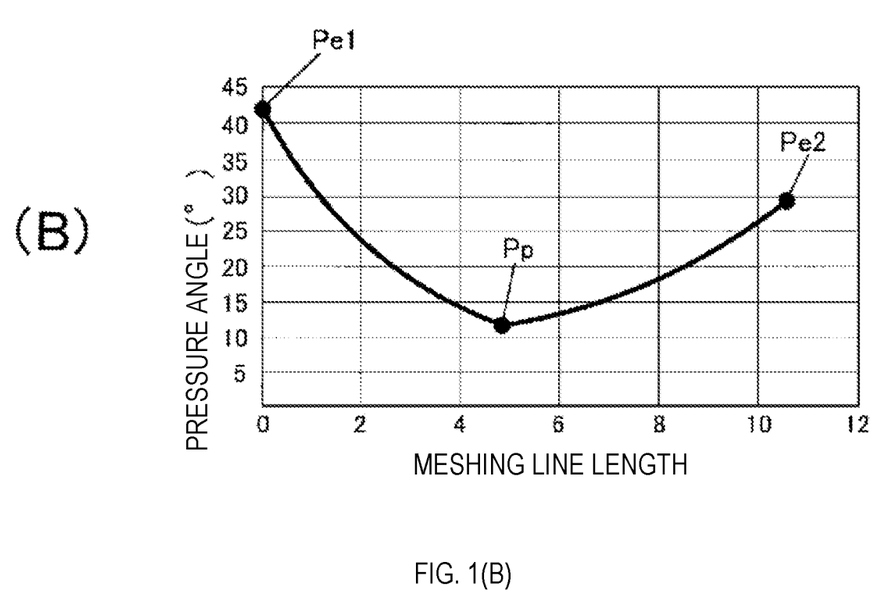
FIG. 1(B) shows an example setting of a pressure angle with respect to a meshing line length.

In addition, in the gear pair of the present invention, as shown in FIG. 1(B), a pressure angle α is not constant in the entire region of the meshing line L. Here, the pressure angle α will be explained as follows. In a gear pair having rotation axes parallel to each other, an angle α of intersection on an acute angle side between a tangent line La of a pitch circle diameter at a pitch point and a tangent line Lb of the meshing line L at any meshing point of teeth that mesh with each other seen on a projection plane orthogonal to the rotation axes (see FIG. 1(A)) is defined as the pressure angle at the meshing point.

More specifically, in the gear pair of the first embodiment, a mode of change of the pressure angle α with respect to a meshing line length is set to be as shown in a thick solid line of FIG. 1(B), for example. That is, the pressure angle α is set to increase in a section of the meshing line L from the pitch point Pp to the end point Pe1 on the tooth-root side of the first gear G1, and to increase in a section of the meshing line L from the pitch point Pp to the end point Pe2 on the tooth-top side of the first gear G1. Here, the "meshing line length" refers to a length of a segment of the meshing line L from the start point of meshing (specifically, the end point Pe1 on the tooth-root side of the first gear G1), as described above.

Moreover, the pressure angle α is set to be greater than zero (0) degrees (preferably ten degrees or more) in the entire region of the meshing line L. In addition, as is clear from FIG. 1(B), the pressure angle α changes continuously in the entire region of the meshing line L, and there is no point where the curvature diverges in the tooth profile curve.

Figure 1C:
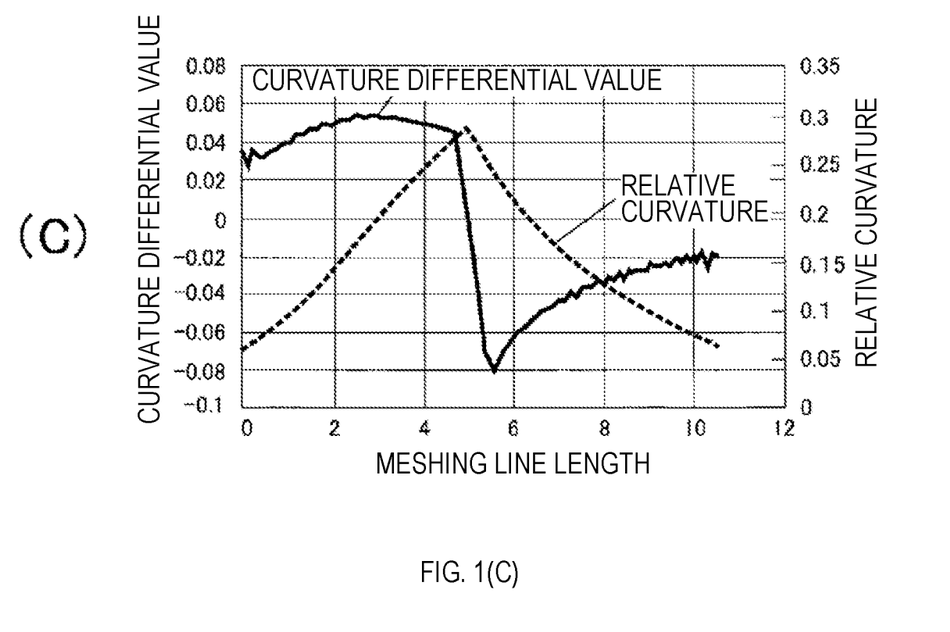
FIG. 1(C) shows an example change in a differential value of a curvature of a tooth profile curve and a relative curvature with respect to the meshing line length.

A thick solid line in FIG. 1(C) shows how a value (that is, a curvature differential value) obtained by differentiating a curvature of the tooth profile curve of the first gear G1 by the meshing line length changes with the meshing line length. From this, it is understood that the curvature differential value is not constant over the entire region of the tooth profile curve, that is, constantly changes. Although not shown, since the first and second gears G1, G2 share the meshing line L, a value obtained by differentiating a curvature of the tooth profile curve of the second gear G2 by the meshing line length is also not constant over the entire region of the tooth profile curve, that is, constantly changes.

A thick dotted line in FIG. 1(C) shows how a relative curvature of the tooth profile curve changes with the meshing line length. Here, the "relative curvature" is defined as a sum of a curvature of a tooth profile curve of one tooth and a curvature of a tooth profile curve of the other tooth at the meshing point of the teeth that mesh with each other, as described above. There is a tendency that a stress limit increases in the vicinity of the tooth surface and a surface pressure strength increases as the relative curvature becomes smaller.

Second Embodiment

Figure 2A:
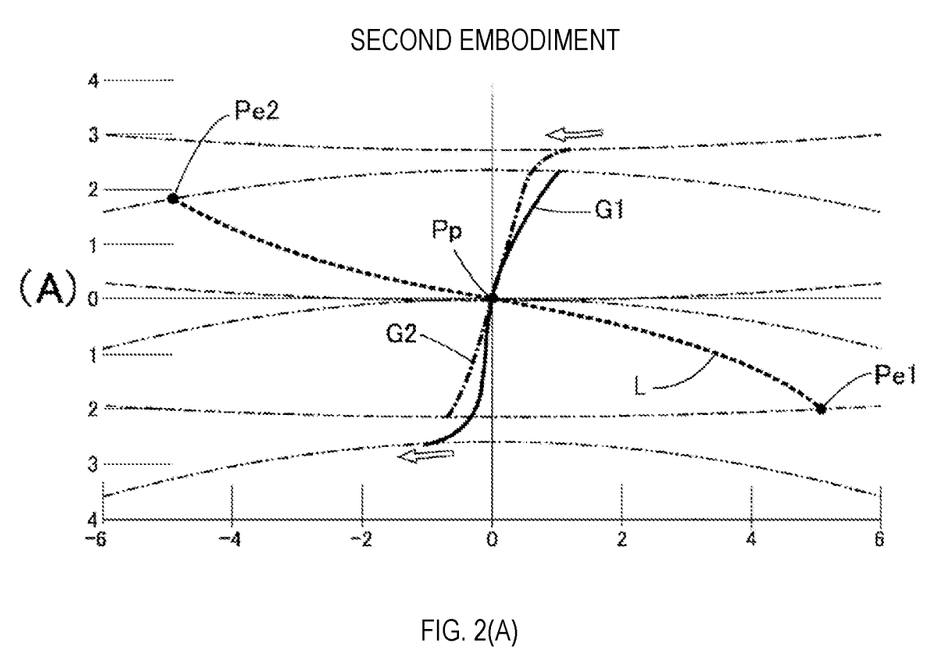
FIG. 2(A) shows an example of tooth surfaces and a meshing line of teeth that mesh with each other.

Next, a gear pair of the second embodiment will be described with reference to FIGS. 2(A) to 2(C).

Specifically, in the first embodiment, the pressure angle α increases in the section of the meshing line L from the pitch point Pp to the end point Pe1 on the tooth-root side of the first gear G1, and increases in the section from the pitch point Pp to the end point Pe2 on the tooth-top side of the first gear G1. In the second embodiment, the pressure angle α is set to remain constant in a section of the meshing line L from the pitch point Pp to a specific intermediate point Pm1 on the tooth-root side of the first gear G1 and increase in a section from the specific intermediate point Pint to the end point Pe1 on the tooth-root side of the first gear G1. Also, in the second embodiment, the pressure angle α is set to remain constant in a section from the pitch point Pp to a specific intermediate point Pm2 on the tooth-top side of the first gear G1 and increase in a section from the specific intermediate point Pm2 to the end point Pe2 on the tooth-top side of the first gear G1.

Figure 2B:
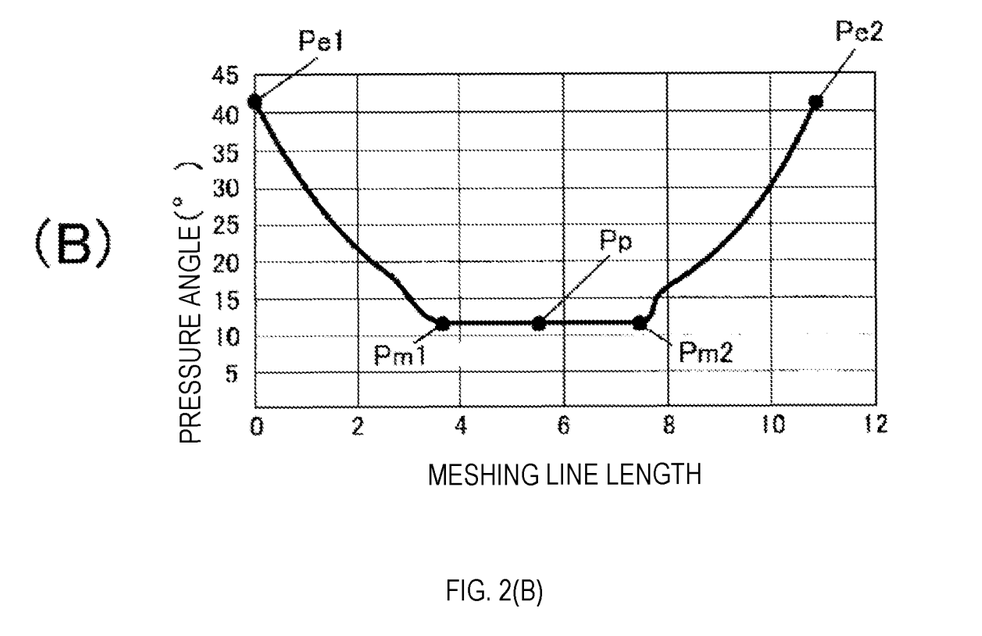
FIG. 2(B) shows an example setting of a pressure angle with respect to a meshing line length.

In the second embodiment, the mode of change of the pressure angle α with respect to the meshing line length is shown by a thick solid line in FIG. 2(B). The thick solid line in FIG. 2(C) shows how the curvature differential value obtained by differentiating the curvature of the tooth profile curve of the first gear G1 by the meshing line length changes with the meshing line length. Further, a thick dotted line in FIG. 2(C) shows how the relative curvature of the tooth profile curve changes with the meshing line length.

Third Embodiment

Figure 3A:
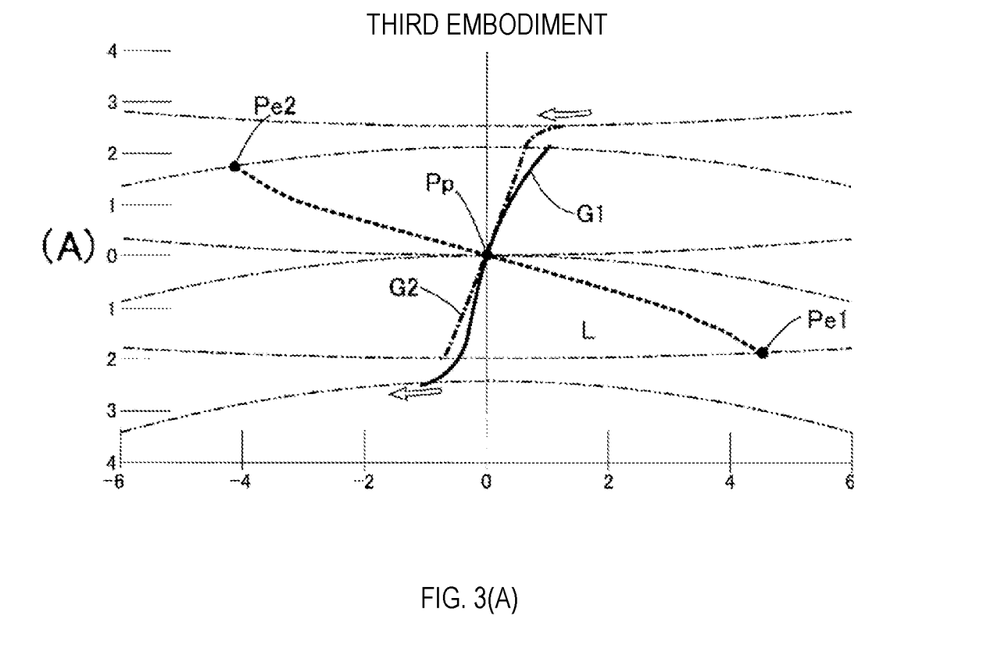
FIG. 3(A) shows an example of tooth surfaces and a meshing line of teeth that mesh with each other.

Next, a gear pair of the third embodiment will be described with reference to FIGS. 3(A) to 3(C).

Specifically, in the first embodiment, the pressure angle α increases in the section of the meshing line L from the pitch point Pp to the end point Pe1 on the tooth-root side of the first gear G1 and increases in the section from the pitch point Pp to the end point Pe2 on the tooth-top side of the first gear G1. In the third embodiment, the pressure angle α is set so that there is a section in which the pressure angle α remains constant while the pressure angle α increases in the section of the meshing line L from the pitch point Pp to the end point Pe1 on the tooth-root side of the first gear G1, and there is a section in which the pressure angle α remains constant while the pressure angle α increases in the section from the pitch point Pp to the end point Pe2 on the tooth-top side of the first gear G1.

Figure 3B:
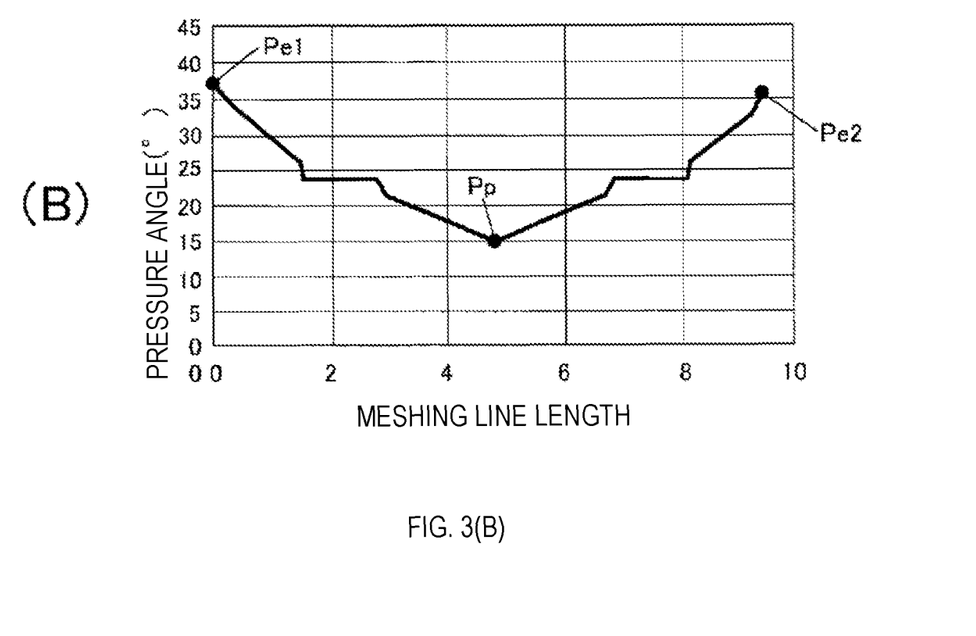
FIG. 3(B) shows an example setting of a pressure angle with respect to a meshing line length.

In the third embodiment, the mode of change of the pressure angle α with respect to the meshing line length is shown by a thick solid line in FIG. 3(B). A thick solid line in FIG. 3(C) shows how the curvature differential value obtained by differentiating the curvature of the tooth profile curve of the first gear G1 by the meshing line length changes with the meshing line length. Further, a thick dotted line in FIG. 3(C) shows how the relative curvature of the tooth profile curve changes with the meshing line length.

Next, an action of the above-described gear pairs of the first to third embodiments will be described.

The tooth profile curves of the first and second gears G1, G2 of the respective embodiments can be calculated by a computer, for example, based on basic design data of the two gears G1, G2 (for example, the number of the teeth, the pitch circle diameter, dedendum circle and addendum circle diameters, etc.) and data of the pressure angle α to be set at each meshing point on the meshing line L (see FIGS. 1(B), 2(B) and 3(B)). The tooth profile curves can be uniquely determined from the calculation results. The first and second gears G1, G2 are formed by forging or precision machining based on the determined tooth profile curves.

In the gear pair of each of the first to third embodiments manufactured as above, the teeth that mesh with each other share the meshing line L. Accordingly, the first and second gears G1, G2 can achieve smooth meshing, and transmission efficiency can be increased. Moreover, at least a part of the meshing line L includes a region where the pressure angle α is not constant. Therefore, while the meshing line L is shared as described above, the pressure angle α of the two gears G1, G2 can be set to various modes of change in association with the meshing line L. As a result, both the desired properties (for example, strength) in accordance with the setting, and smooth meshing can be achieved.

In the gear pair of each of the first to third embodiments, the pressure angle α weakly increases (more specifically, increases in the first embodiment, increases after being constant in the second embodiment, and remains constant in the middle of increase in the third embodiment) in the section of the meshing line L from the pitch point Pp to the end point Pe1 on the tooth-root side of the first gear G1. This can reduce the relative curvature and increase the surface pressure strength on the tooth-root side of the first gear G1. Moreover, since the tooth profile curve comes close to a negative curvature or has a negative curvature on the tooth-root side, the tooth profile becomes wider toward the tooth root than when the pressure angle α is simply increased. Thus, the bending strength can be increased. Accordingly, it is possible to effectively increase the strength on the tooth-root side of the gear having a small number of teeth (that is, the first gear G1) which is subject to a large load and susceptible to damages especially on the tooth-root side.

In addition, especially in the gear pair of each of the first to third embodiments, the pressure angle α weakly increases not only in the section of the meshing line L from the pitch point Pp to the end point Pe1 on the tooth-root side of the first gear G1, but also in the section from the pitch point Pp to the end point Pe2 on the tooth-top side of the first gear G1. This can reduce the relative curvature and increase the surface pressure strength not only on the tooth-root side but also on the tooth-top side of the first gear G1 (that is, the gear having a small number of teeth).

As the number of the meshing teeth changes during the meshing, contact stiffness of each tooth changes. As shown in FIG. 2(B), especially in the gear pair of the second embodiment, the pressure angle α remains constant in the section of the meshing line L from the pitch point Pp to the specific intermediate point Pm1 on the tooth-root side of the first gear G1, and the pressure angle α increases from the specific intermediate point Pm1 to the end point Pe1 on the tooth-root side of the first gear G1. Moreover, the pressure angle α remains constant in the section from the pitch point Pp to the specific intermediate point Pm2 on the tooth-top side of the first gear G1, and the pressure angle α increases in the section from the specific intermediate point Pm2 to the end point Pe2 on the tooth-top side of the first gear G1. As a result, by setting the meshing region where the number of the meshing teeth is large (and thus contact stiffness of each tooth is high) to a pressure angle constant section where the relative curvature is large and the contact stiffness of the tooth surface is low, the tooth surface deformation due to Hertzian contact per tooth can be made relatively large. Thus, increase or decrease in contact stiffness of the tooth surface accompanying the change in the number of the meshing teeth during the meshing can be cancelled by increase or decrease in the tooth surface deformation based on the Hertzian contact. Accordingly, the meshing stiffness of the entire tooth profile can be as uniform as possible (that is, difference in contact stiffness can be alleviated) even with the change in the number of the meshing teeth. Further, by specially providing the aforementioned pressure angle constant section (Pm1 to Pp to Pm2), change in the relative curvature during the meshing can be reduced. Thus, smoother meshing can be achieved.

Figure 2C:
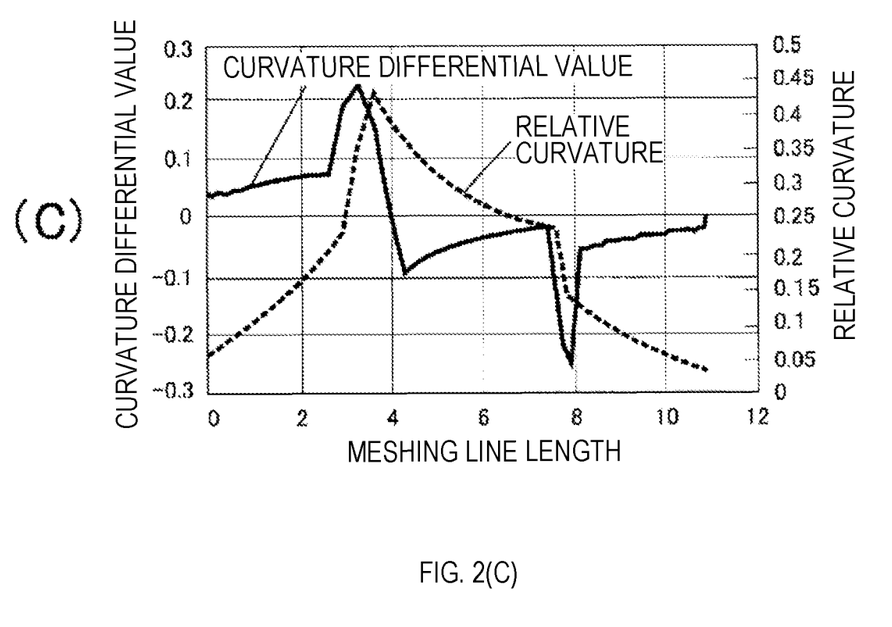
FIG. 2(C) shows an example change in a differential value of a curvature of a tooth profile curve and a relative curvature with respect to the meshing line length.
Figure 3C:
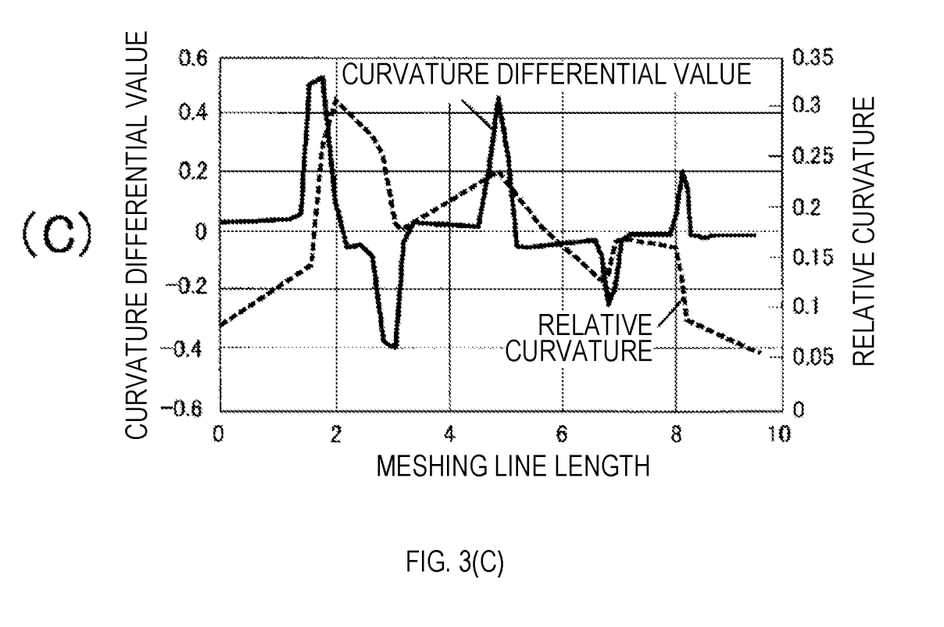
FIG. 3(C) shows an example change in a differential value of a curvature of a tooth profile curve and a relative curvature with respect to the meshing line length.

In the gear pair of each of the first to third embodiments, the value obtained by differentiating the curvature of the tooth profile curve by the meshing line length constantly changes, as shown in FIGS. 1(C), 2(C) and 3(C). This allows setting such that the relative curvature at the meshing point of the teeth that mesh with each other also constantly changes during the meshing and a resulting curvature distribution alleviates a difference in the contact stiffness of the tooth surface during the meshing (for example, a relative curvature of a one-tooth meshing region can be reduced, and a relative curvature of a two-teeth meshing region can be increased). Therefore, it is clear that the gear pair of the first to third embodiments differ from IP bevel gears or COR-NUX (registered trademark) gears.

According to the gear pair of each of the first to third embodiments, the pressure angle is set to be greater than zero (0) degrees (preferably, 10 degrees or more) in the entire region of the meshing line L, as shown in FIGS. 1(B), 2(B) and 3(B). This reduces the relative curvature at the meshing point of the teeth that mesh with each other on average and increases the surface pressure strength. Moreover, the pressure angle α changes continuously in the entire region of the meshing line L, and there is no point where the curvature diverges in the tooth profile curve, that is, there is no point where the surface pressure is infinite in theory. Thus, in this regard as well, the surface pressure strength is improved. Therefore, it is clear that the gear pair of the first to third embodiments differ from cycloid gears.

In the first to third embodiments described above, the first and second gears G1, G2 forming the gear pair are spur gears having the rotation axes parallel to each other. The first and second gears G1, G2 that form the gear pair of the present invention may be bevel gears having intersecting rotation axes. A pair of bevel gears (figures of the tooth profile are omitted) will be a gear pair of a fourth embodiment.

Fourth Embodiment

Figure 4:
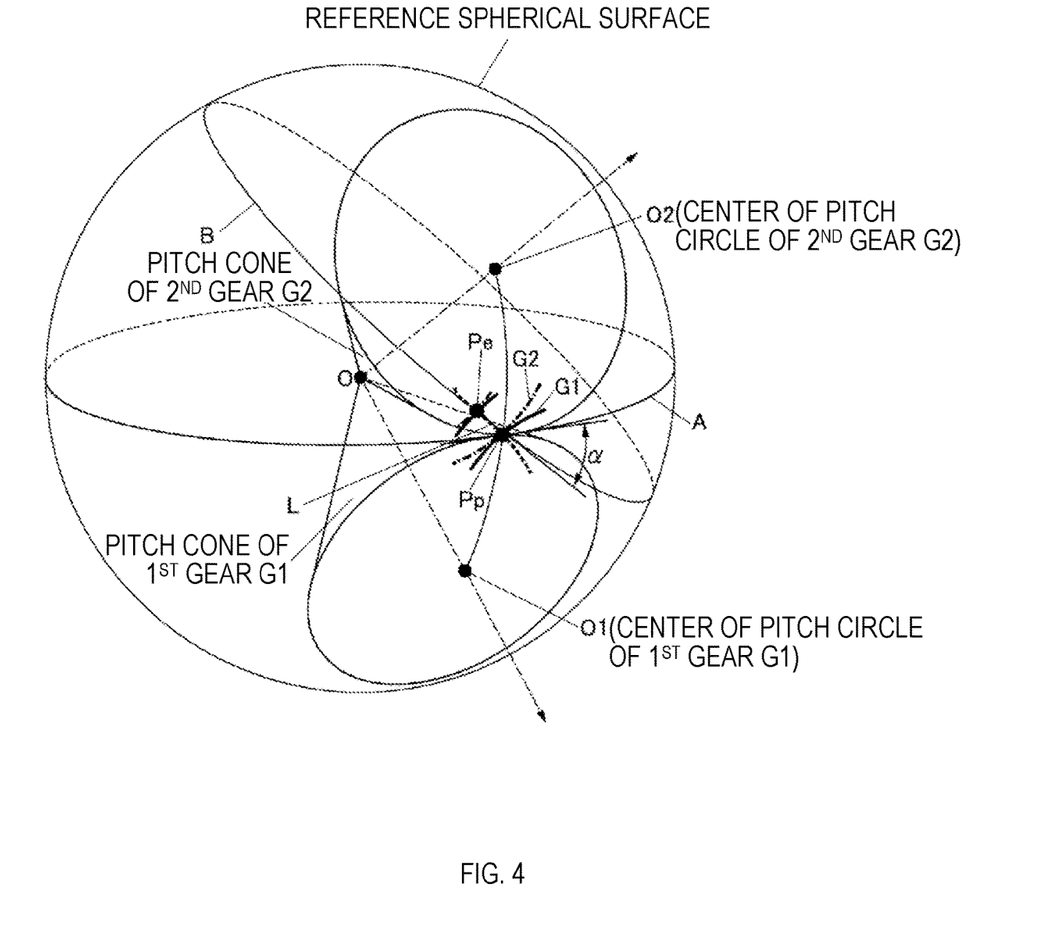
FIG. 4 is an explanatory diagram explaining a definition of a pressure angle of a spherical tooth profile in a gear pair according to a fourth embodiment.

The bevel gear pair of the fourth embodiment has a spherical tooth profile, and the pressure angle is defined as below with reference to FIG. 4.

Specifically, it is assumed that a small diameter gear having a smaller number of teeth of the bevel gear pair is the first gear G1, and a large diameter gear having a larger number of teeth than the first gear G1 is the second gear G2. Further, it is assumed that, when a spherical surface including the meshing line L (thick dotted line in FIG. 4) is a reference spherical surface, a circle formed by cutting the reference spherical surface with a plane including a center O of the reference spherical surface and the pitch point Pp on the meshing line L is a pitch large circle A, and a circle formed by cutting the reference spherical surface with a plane tangent to the meshing line L at any meshing point Pe of the teeth that mesh with each other is a small circle B. On that assumption, an angle $\alpha$ of intersection on the acute angle side between the pitch large circle A and the small circle B is defined as a pressure angle at the meshing point Pe.

In the fourth embodiment as well, the tooth profile curves of the first and second gears G1, G2 are determined by the method according to the present invention similar to the method explained in the first to third embodiments, and the first and second gears G1, G2 are formed by forging based on the determined tooth profile curves. In this way, even if the first and second gears G1, G2 have complex spherical tooth profiles, the first and second gears G1, G2 can be relatively easily and accurately formed by forging.

As an example of the bevel gear pair according to the fourth embodiment, an embodiment is also possible in which a pinion gear formed by a bevel gear in a differential gear mechanism is the first gear G1, and a side gear formed by a bevel gear that meshes with the pinion gear is the second gear G2, for example.

Embodiments of the present invention have been explained above, but the present invention is not limited to the above-described embodiments and may be modified in a variety of ways as long as the modifications do not depart from the gist of the present invention.

For example, in the first to third embodiments, the first and second gears G1, G2 forming the gear pair are spur gears having the rotation axes parallel to each other. Alternatively, the first and second gears G1, G2 may be helical gears having rotation axes parallel to each other.

Some examples of the tooth profile curves of the first and second gears G1, G2 according to the present invention are shown in the first to third embodiments. Further, various tooth profile curves can be set without limitation to these examples. For example, settings as below are possible: (1) a tooth profile curve in which a concave surface on the tooth-root side and a convex surface on the tooth-top side are connected; (2) a tooth profile curve connecting from the concave surface on the tooth-root side to the convex surface on the tooth-top side via a specific transition zone; (3) a tooth profile curve extending from the concave surface on the tooth-root side to the tooth top in a straight line; (4) a tooth profile curve in which multiple patterns of transition zones are interposed between the concave surface on the tooth-root side and the convex surface on the tooth-top side; and so on. In any of the aforementioned tooth profile curves as well, the tooth profile curve is determined on a condition that the meshing line L of the teeth of the first and second gears G1, G2 that mesh with each other is shared and that at least a part of the meshing line L includes a region where the pressure angle $\alpha$ is not constant.

In the tooth profile curve having a spherical tooth profile of a bevel gear as in the fourth embodiment as well, similar to the aforementioned tooth profile patterns of the spur gear in the first to third embodiments, settings as below are possible, for example: (1) a tooth profile curve in which the concave surface on the tooth-root side and the convex surface on the tooth-top side are connected; (2) a tooth profile curve connecting from the concave surface on the tooth-root side to the convex surface on the tooth-top side via the specific transition zone; (3) a tooth profile curve extending from the concave surface on the tooth-root side to the tooth top in a straight line; (4) a tooth profile curve in which multiple patterns of transition zones are interposed between the concave surface on the tooth-root side and the convex surface on the tooth-top side; and so on.

The invention claimed is:

1. A gear pair, comprising:
   a first gear; and
   a second gear having a larger number of teeth than the first gear, wherein the first gear
   and the second gear share a meshing line of teeth that mesh with each other,
   at least a part of the meshing line includes a region where a pressure angle is not constant,
   the pressure angle increases in a section of the meshing line from a pitch point to an end point on a tooth-root side of the first gear, and
   the pressure angle is constant in a section of the meshing line from the pitch point to a specific intermediate point on the tooth-root side of the first gear, and the pressure angle increases in a section from the specific intermediate point on the tooth-root side to the end point on the tooth-root side of the first gear.

2. The gear pair according to claim 1, wherein the pressure angle increases in a section of the meshing line from the pitch point to an end point on a tooth-top side of the first gear.

3. The gear pair according to claim 1, wherein the pressure angle is constant in a section of the meshing line from the pitch point to a specific intermediate point on a tooth-top side of the first gear, and the pressure angle increases in a section from the specific intermediate point on the tooth-top side to an end point on the tooth-top side of the first gear.

4. The gear pair according to claim 1, wherein a value obtained by differentiating a curvature of a tooth profile curve by a meshing line length constantly changes in an entire region of the meshing line.

5. The gear pair according to claim 1, wherein the pressure angle is greater than zero degrees in an entire region of the meshing line.

6. The gear pair according to claim 1, wherein the first and second gears are forged bevel gears.

7. A gear pair, comprising:
   a first gear; and
   a second gear having a larger number of teeth than the first gear, wherein the first gear
   and the second gear share a meshing line of teeth that mesh with each other,
   at least a part of the meshing line includes a region where a pressure angle is not constant, the pressure angle increases in a section of the meshing line from a pitch point to an end point on a tooth-root side of the first gear, and the pressure angle is constant in a section of the meshing line from the pitch point to a specific intermediate point on a tooth-top side of the first gear, and the pressure angle increases in a section from the specific intermediate point on the tooth-top side to an end point on the tooth-top side of the first gear.

8. The gear pair according to claim 7, wherein a value obtained by differentiating a curvature of a tooth profile curve by a meshing line length constantly changes in an entire region of the meshing line.

9. The gear pair according to claim 7, wherein the pressure angle is greater than zero degrees in an entire region of the meshing line.

10. The gear pair according to claim 7, wherein the first and second gears are forged bevel gears.

\* \* \* \* \*